United States Patent [19]
McAndrews et al.

[11] Patent Number: 5,511,288
[45] Date of Patent: Apr. 30, 1996

[54] ADJUSTABLE LOOP CLAMP

[75] Inventors: Glenn McAndrews, Lebanon, Ohio; James T. Hegge, Bellevue, Ky.; Christopher R. Koss, West Chester, Ohio; Michael A. Umney, Mason, Ohio; Douglas J. Jones, Cincinnati, Ohio

[73] Assignee: General Electric Company, Cincinnati, Ohio

[21] Appl. No.: 329,747

[22] Filed: Oct. 26, 1994

[51] Int. Cl.⁶ .............................. A44B 11/00; A44B 21/00
[52] U.S. Cl. .............................. 24/16 R; 24/170; 24/273; 248/74.3
[58] Field of Search .................... 24/16 R, 16 PB, 24/17 R, 19, 268, 273, 170; 247/74.3, 74.5, 75

[56] References Cited

U.S. PATENT DOCUMENTS

| | | | |
|---|---|---|---|
| 1,094,332 | 4/1914 | Hubbard | 24/273 |
| 2,961,211 | 11/1960 | Emery . | |
| 3,159,708 | 12/1964 | Deal | 248/74.3 |
| 4,008,512 | 2/1977 | Prodel | 24/16 PB |
| 4,389,754 | 6/1983 | Sohma . | |
| 4,458,385 | 7/1984 | Espinoza . | |
| 4,813,105 | 3/1989 | Espinoza . | |
| 4,881,303 | 11/1989 | Martini | 24/170 |
| 4,971,272 | 11/1990 | Gudridge et al. . | |
| 5,042,114 | 8/1991 | Parrish . | |
| 5,136,757 | 8/1992 | Labonville | 24/273 |
| 5,193,250 | 3/1993 | Caveney . | |
| 5,271,127 | 12/1993 | Christensen | 24/16 R |

Primary Examiner—Victor N. Sakran
Attorney, Agent, or Firm—Andrew C. Hess; Nathan D. Herkamp

[57] ABSTRACT

An adjustable loop clamp assembly provides improved retention of electrical cables, tubes or hoses. The clamp assembly comprises a flexible strap with first and second ends. A base, having an elevated platform, a lower platform, a midsection, and two side supports, receives a second end of the strap in an aperture of the midsection. The first strap end is securably affixed to the elevated platform of the base. Support holes in the side supports receive pin portions of a locking cam, the locking cam further comprising a handle portion and a cam portion. A mount bolt is receivable in alignable apertures of the lower platform and the handle portion. The pin portions of the locking cam are pivotably engaged into the mount holes of the side supports, allowing rotation of the locking cam into a position that engages the strap with the cam portion, locking the strap against the base structure, simultaneously contacting the handle portion against the lower platform, further aligning the mount holes in the handle portion and the lower platform so that when a mount bolt is passed through those holes and secured, the locking cam is prevented from disengagement.

8 Claims, 2 Drawing Sheets

ADJUSTABLE LOOP CLAMP

BACKGROUND OF THE INVENTION

The present invention relates to aircraft engine systems and, more particularly, to an adjustable loop clamp for securing electrical cables, tubes, or hoses in a fixed position.

Loop clamps also known as "P" clamps are used widely in gas turbine engines for securing cables, hoses, and tubes to other engine hardware. The conventional loop clamp is well suited for application with objects having fixed controlled diameters such as tubes. However, many electrical cables have irregular cross-sections, the diameters of which are not dimensionally controlled with tight tolerances. This results in cables being loosely secured with existing loop clamps, because the existing clamps are generally designed for hard tubes with known diameters. This problem also results in added expense, since a number of differently sized loop clamps must be available for use on the same cable bundle.

The loop clamp device has changed very little over the years which is surprising, considering their widespread use and the various problems associated with their use, such as stated above. Most assemblers agree that the installation of these clamps is difficult because of their stiffness. The use of commercially available clamps on electrical cables is further complicated by the fact that cable diameter dimensions, as stated above, are not tightly controlled, and that the cables have "soft" irregular cross sections.

Tie-wraps are familiar devices that are easily installed and offer positive retention, regardless of the shape of the enveloped object. Designs exist that have mount bolt features similar to the "P" clamp, but their use is restricted due to temperature limitations of the materials used in making these ties. Additionally, cable ties are destroyed upon disassembly.

Similar looking ties made of metal have also been explored for use. Unfortunately, removal of these bands after installation is a major obstacle that discourages their use.

It is therefore highly desirable and an object of the present invention to provide an adjustable loop clamp for use in gas turbine engines, which provides improved retention of electrical cables.

Another object of the present invention is to provide such an adjustable loop clamp wherein electrical cables having irregular cross-sections can be tightly secured.

Another object of the present invention is to provide an adjustable loop clamp for securing flexible cables having diameters which are not dimensionally controlled with tight tolerances.

These objects and other features and advantages will become more readily apparent in the following description when taken in conjunction with the appended drawings.

Summary of the Invention

The present invention has been developed to fulfill the needs noted above. The present invention is an adjustable loop clamp particularly suited for use on gas turbine engines and electrical distribution systems to controllably secure electrical cables. The adjustable loop clamp employs a flexible strap that is permanently joined to a steel base, such as by use of a rivet. A pivoting locking cam can "pinch-lock" the strap against the base, forming any desired loop diameter within the limits of the strap length. The device employs a novel positive locking of the locking cam to the base by a mount bolt.

In accordance with one aspect of the present invention, an adjustable loop clamp assembly provides improved retention of electrical cables. The clamp assembly comprises a flexible strap with first and second ends. A base, having an elevated platform, a lower platform, a midsection, and two side supports, receives a second end of the strap in an aperture of the midsection. The first strap end is securably affixed to the elevated platform of the base. Support holes in the side supports receive pin portions of a locking cam, the locking cam further comprising a handle portion and a cam portion. A mount bolt is receivable in alignable apertures of the lower platform and the handle portion. The pin portions of the locking cam are pivotably engaged into the mount holes of the side supports, allowing rotation of the locking cam into a position that engages the strap with the cam portion, locking the strap against the base structure, simultaneously contacting the handle portion against the lower platform, further aligning the mount holes in the handle portion and the lower platform so that when a mount bolt is passed through those holes and secured, the locking cam is prevented from disengagement.

In the drawings as hereinafter described, a preferred embodiment is depicted; however, various other modifications and alternative constructions can be made thereto without departing from the true spirit and scope of the invention.

DETAILED DESCRIPTION OF THE PREFERRED EMBODIMENTS

Figure 1:
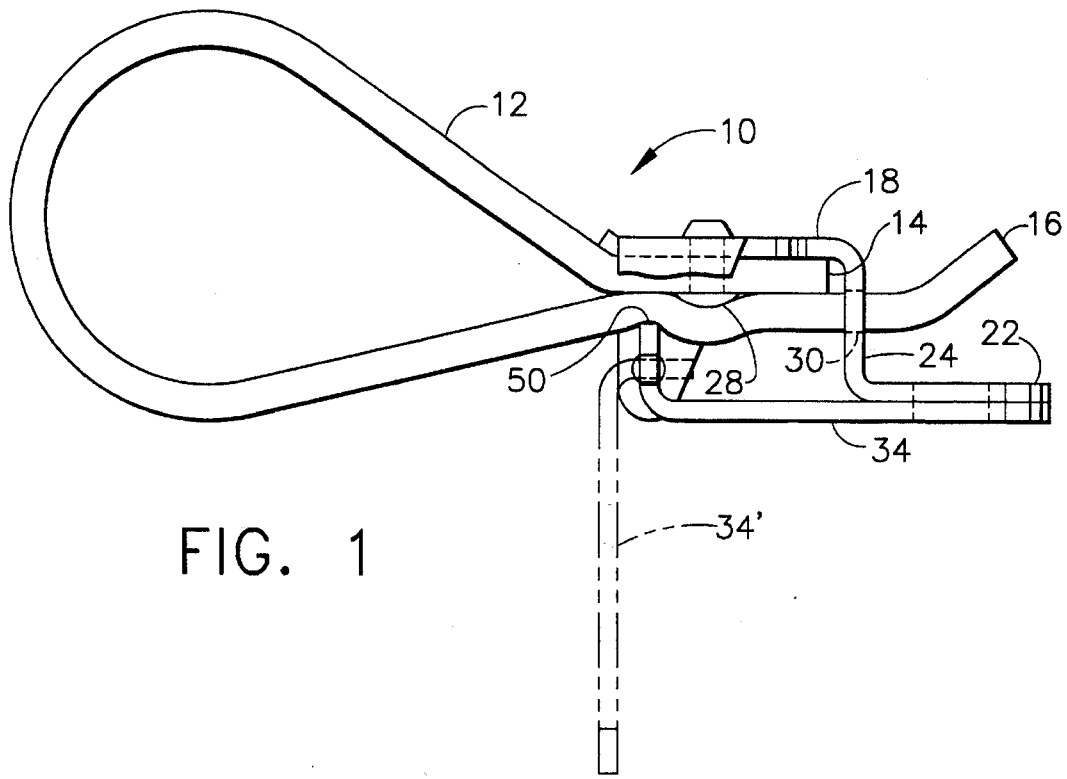
FIG. 1 is a side view of the clamp assembly, according to the present invention.
Figure 2:
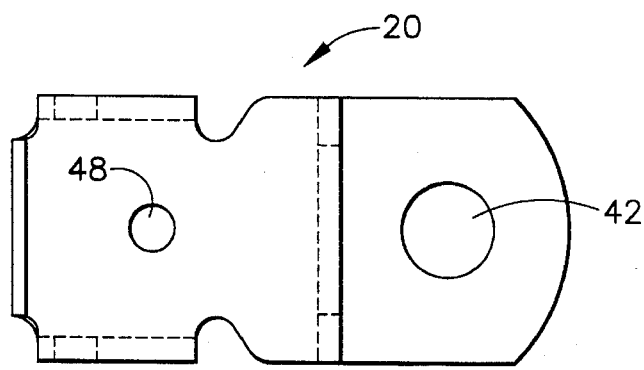
FIG. 2 is a side view of a base section of the clamp assembly of FIG. 1.

Referring now to the drawings, in FIG. 1 there is illustrated a flexible loop clamp assembly 10, according to the present invention. The clamp assembly 10 comprises a flexible strap 12 having a first end 14 and a second end 16. The first end 14 of the strap 12 is securably attached to an elevated platform 18 of a base 20, best illustrated in FIG. 2. The base 20 further comprises a lower platform 22, a midsection 24 associating the elevated and lower platforms 18 and 22, and a pair of opposing side supports 26 attached to the elevated platform 18.

Figure 4:
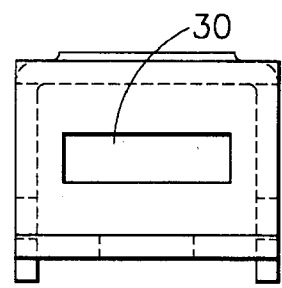
FIG. 4 is a front view from the right end of the base of FIG. 2.

Continuing with FIG. 1, the clamp assembly 10 further comprises strap attaching means, such as a rivet 28, for securably affixing the first end 14 of the strap 12 to the elevated platform 18 of the base 20. A slot 30, best illustrated in FIG. 4, located in the midsection 24 of the base 20 receives the second end 16 of the strap 12.

Figure 3:
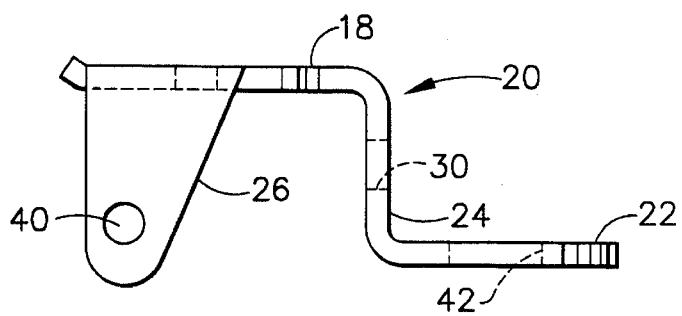
FIG. 3 is a top view of the base of FIG. 2.
Figure 6:
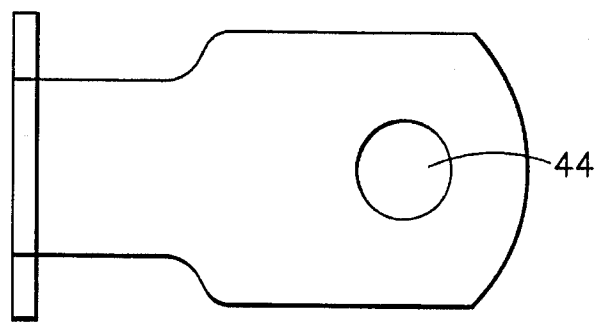
FIG. 6 is a top view of the locking cam of FIG. 5.
Figure 5:
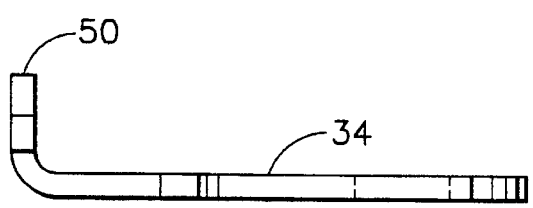
FIG. 5 is a side view of a locking cam associated with the clamp assembly of FIG. 1.
Figure 7:
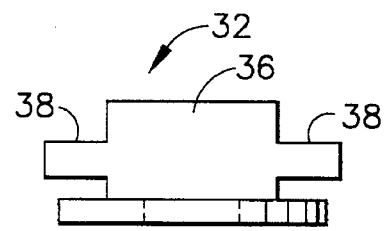
FIG. 7 is a right end view of the locking cam of FIG. 5.
Figure 8:
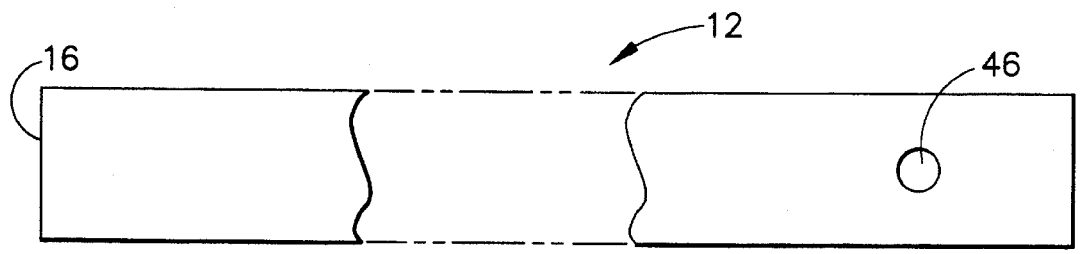
FIG. 8 is a top view of a flexible strap portion of the clamp assembly of FIG. 1.

A locking cam 32 illustrated in FIG. 7, comprises a handle portion 34, as illustrated in FIG. 5, a cam portion 36, and pin portions 38. The pin portions 38 are pivotably engageable into support apertures 40 of base 20, allowing rotation of the locking cam 32 into a position that engages the strap 12 with edge 50 of cam portion 36, locking the strap 12 against the base 20 structure, and simultaneously contacting the handle portion 34 against the lower platform 22. A first mount bolt aperture 42 is located in the lower platform 22, as illustrated in FIG. 3; and a second mount bolt aperture 44 is located in the handle 34, as illustrated in FIG. 6. When pin portions 38 of locking cam 32 are pivotably engaged into the support apertures 40 of side supports 26, the first and second mount bolt apertures 42 and 44 are aligned in each of the handle 34 and the lower platform 22 so that when a mount bolt (not shown) is passed through apertures 42 and 44 and secured, the locking cam 32 is prevented from disengagement.

The clamp assembly 10 preferably employs a flexible fiberglass strap 12 that is permanently joined to a base 20, preferably manufactured of a corrosion resistant steel, by a joining means such as rivet 28. The strap 12 is captured by rivet 28 through aperture 46 and permanently affixed in aperture 48. The pivoting locking cam 32 can "pinch-lock" the strap 12 against the base 20, forming any desired loop diameter within the limits of the strap length. The strap length itself may be any desired length. End 16 of strap 12 can include a metal edge to prevent fraying of the strap 12. The clamp assembly of the present invention provides for positive locking of the locking cam to the base by the mount bolt (not shown) received through apertures 42 and 44.

In operation, the free end 16 of the strap 12 is passed around a cable or hose so that the free end 16 is positioned to enter slot 30 of base 20. The handle 34 is rotated about pivot point, aperture 40, to a position that permits the free end 16 of the strap 12 to pass between the handle and the elevated platform 18 of base 20, and continue through slot 30 in the base midsection 24. The strap 12 is pulled tightly around the hose or cable. The handle 34, currently in the open position as indicated by phantom handle 34', may now be rotated into the closed position of handle 34, whereby the flat surface of the handle and the lower platform of the base are brought into contact. When this is done, edge 50 at the opposite end of the handle 34 is being brought into contact with the strap, effectively locking its position with a friction force. In this position, the bolt holes 42 and 44 of both the base and the handle are aligned so as to allow a securing bolt to be passed through. The combination of clamp and cable, tube or hose may now be secured with the mount bolt.

The present invention is particularly adaptable for use on gas turbine engines for controllably securing electrical cables having irregular cross-sections, the diameters of which are not dimensionally controlled with tight tolerances. The present invention provides the feature of a positive lock of the handle, afforded by the mount bolt joining the locking cam to the base. A tighter clamp connection is afforded by the device of the present invention, as compared to existing loop clamps. It is an advantage of the present invention that the current need to provide a range of clamp sizes is eliminated.

It is seen from the foregoing, that the objectives of the present invention are effectively attained, and, since certain changes may be made in the construction set forth, it is intended that matters of detail be taken as illustrative and not in a limiting sense.

What is claimed is:

1. A clamp assembly comprising:

(a) a strap with first and second ends;

(b) a base having an elevated platform, a lower platform, and a pair of opposing side supports, each of said pair of opposing side supports having a support aperture;

(c) strap attaching means for securably affixing said first strap end to said base;

(d) strap receiving means for receiving said second end of said strap;

(e) a locking cam having a handle portion, a cam portion, and pin protrusions, said pin protrusions pivotally engageable into said support apertures, allowing rotation of the locking cam into a position that engages the strap with the cam portion, locking the strap against the base while simultaneously contacting the handle portion against the lower platform; and (f) mount bolt receiving means in said lower platform and said handle portion, said mount bolt receiving means in said lower platform being in alignment with said mount bolt receiving means in said handle portion, for receiving a securable mount bolt to prevent the locking cam from disengagement.

2. A clamp assembly as claimed in claim 1 wherein said first end of said strap is securably affixed to said elevated platform of said base.

3. A clamp assembly as claimed in claim 1 wherein said base further comprises a midsection situated between said elevated platform and said lower platform.

4. A clamp assembly as claimed in claim 3 wherein said strap receiving means comprises a slot in said midsection of said base.

5. A clamp assembly as claimed in claim 1 wherein said side supports are permanently affixed to said elevated platform.

6. A clamp assembly as claimed in claim 1 wherein said strap attaching means comprises a rivet.

7. A clamp assembly as claimed in claim 1 wherein said locking cam is capable of pinch-locking said strap against said base to form any desired loop diameter.

8. A clamp assembly as claimed in claim 1 wherein said strap comprises a flexible strap.

* * * * *